Aug. 23, 1949.                H. CHANOWITZ                2,479,557
                RHEOSTAT STRUCTURE AND METHOD OF MOLDING
Filed Dec. 4, 1946                              3 Sheets-Sheet 3
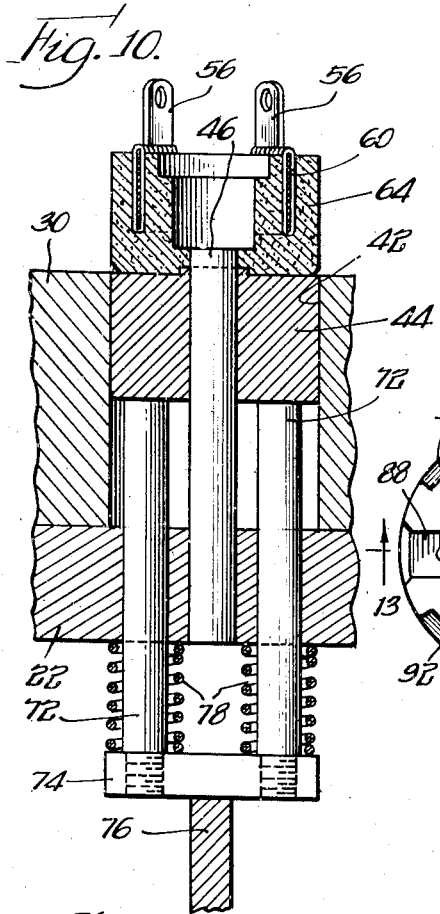
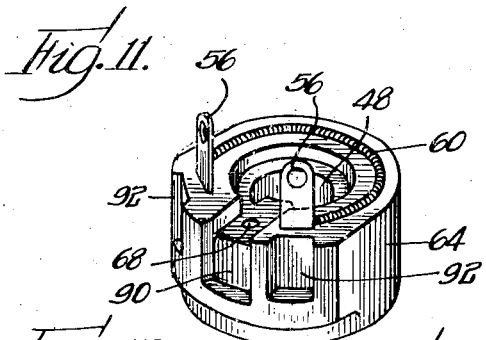
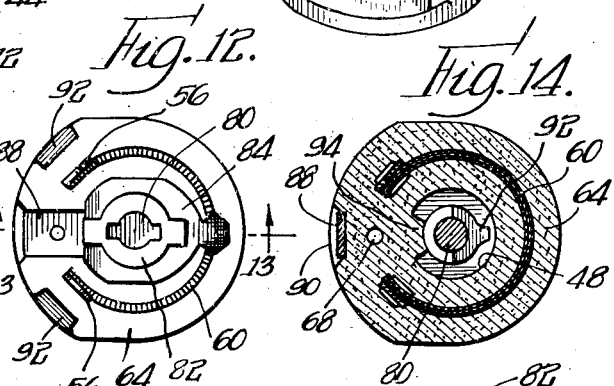
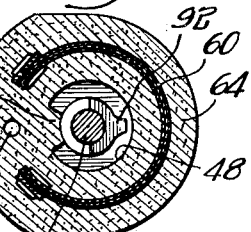
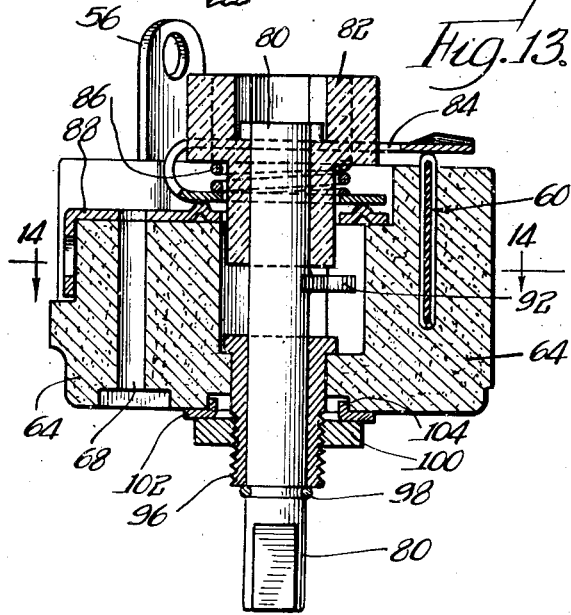
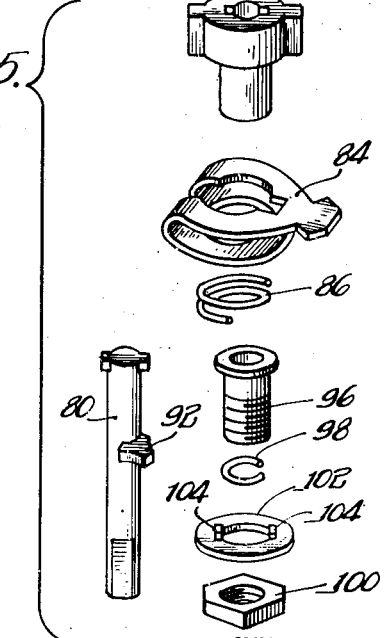
INVENTOR.
Harry Chanowitz
BY
Moore, Olson & Trexler
attys.

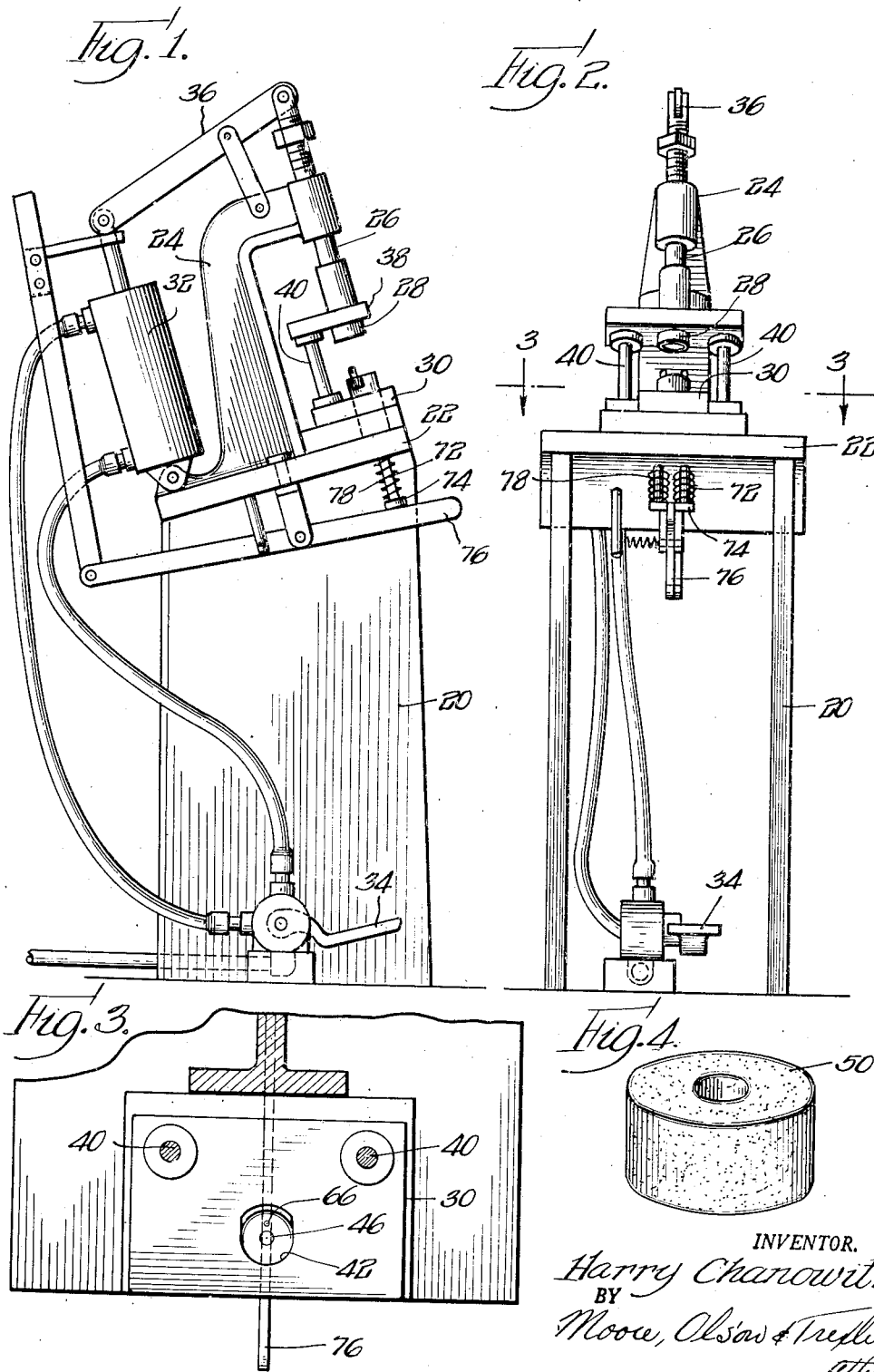

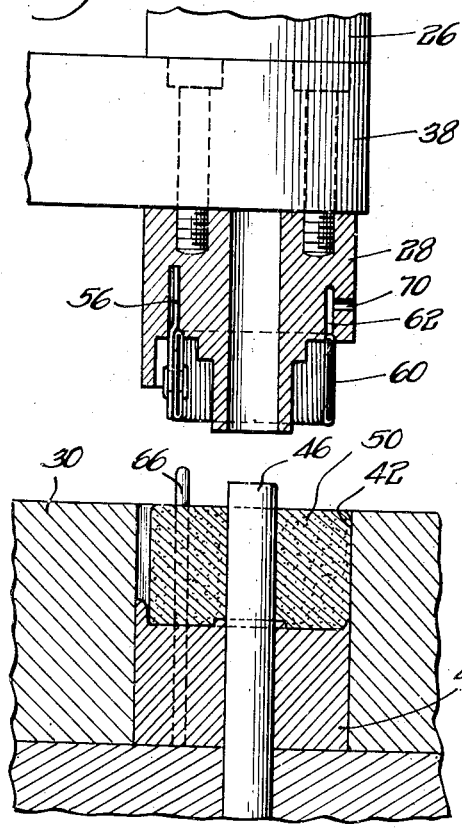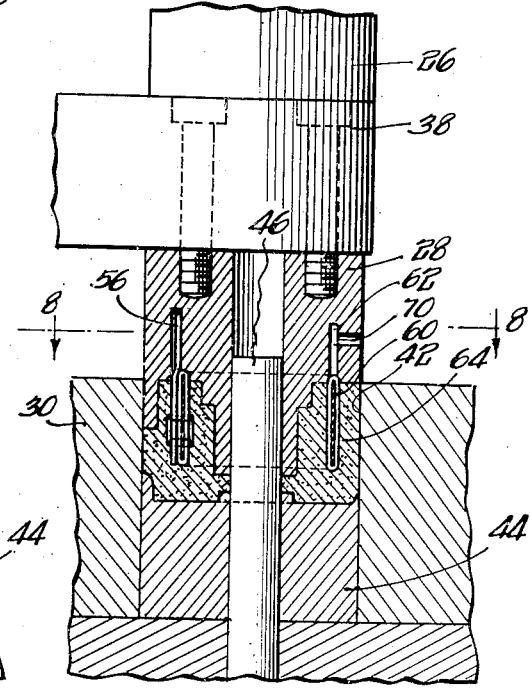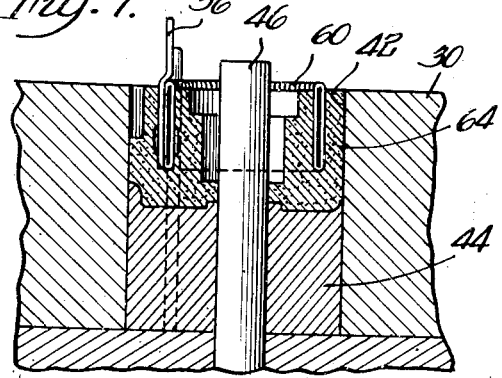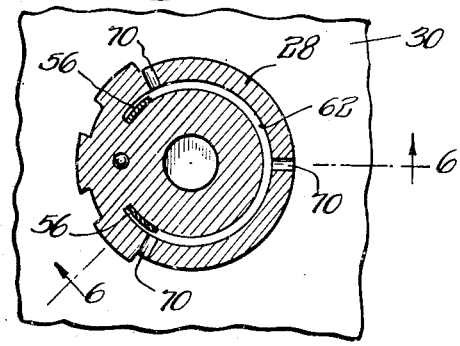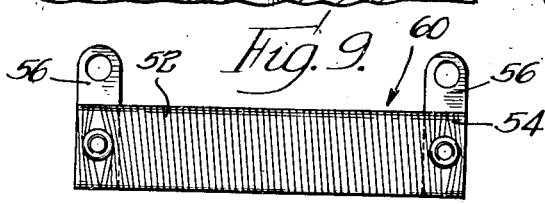

Patented Aug. 23, 1949

2,479,557

UNITED STATES PATENT OFFICE 2,479,557

RHEOSTAT STRUCTURE AND METHOD OF MOLDING

Harry Chanowitz, Chicago, Ill., assignor to David T. Siegel, Wheaton, Ill.

Application December 4, 1946, Serial No. 713,889

11 Claims. (Cl. 201—63)

This invention relates to the art of molding, and particularly to the manufacture of molded articles such as rheostats.

In the present specification and claims the term "rheostat" should be construed in its generic sense as denoting a device usually having an arcuately disposed resistance element and which is so constituted that the amount of resistance in use can be adjusted by the movement of a control knob. This definition embraces rheostats of both the series type and the voltage-divider or potentiometer type.

In the past it has been customary to construct rheostats by mounting a resistance element in a suitable groove or recess in a preformed ceramic body so that the element is partly exposed. The groove is then filled with a vitreous enamel which is hardened by baking or firing. The intense heat required to bake the enamel produces oxidation of the exposed portions of the wire and the soldering lugs of the resistance element. These parts must be cleaned of oxide and excess enamel before the device can be used. Such cleaning frequently causes breaking of the wire in the resistance element and consequent spoilage of the piece. Moreover, it is not convenient to tin the lugs for soldering after the resistance element has been set in the ceramic body. Another disadvantage in this method is that it is likely to deform the resistance element so that it has an irregular contour instead of lying on a circle. Moreover, the ceramic body, while it has considerable strength, is relatively expensive, and there are many instances in which it is desirable to provide a dependable construction by means involving a material reduction in cost.

With the foregoing in mind, therefore, it is an object of this invention to provide a satisfactory rheostat or like article in a single molding operation which avoids the use of a relatively expensive preformed body and eliminates the heat-hardening process and subsequent cleaning and tinning of the resistance element.

Further objects are to secure the resistance element to the body of the rheostat in such a manner that the element is disposed on a substantially circular arc instead of having an irregular shape which deviates therefrom, and to insure that the individual turns of the wire element are kept separated from each other.

Still another object is to provide a novel, inexpensive and feasible method of producing rheostats.

A still further object is to improve the manufacture of rheostats and like articles by the use of water-hardenable cementitious material in the insulating bodies of such rheostats.

Various other objects, advantages and features of the invention will be apparent from the following specification when taken in connection with the accompanying drawings wherein a certain preferred embodiment is set forth for purposes of illustration.

In the drawings, wherein like reference numerals refer to like parts throughout:

Fig. 1 is a side elevation of a molding machine adapted to utilize my improved method for the production of rheostats and like articles;

Fig. 2 is a front elevation of the molding machine;

Fig. 3 is a plan section taken on the line 3—3 in Fig. 2;

Fig. 4 is a perspective view of a crudely shaped mass of moldable material which may be used to form molded objects in accordance with the principles of my invention;

Fig. 5 is a fragmentary view in vertical section, looking from the side of the machine and illustrating a step in the method of manufacturing molded articles according to the invention;

Fig. 6 is a sectional view similar to Fig. 5 and showing another step in the method;

Fig. 7 is a sectional view of the molded article and a surrounding portion of the molding machine after completion of the molding process;

Fig. 8 is a cross-sectional view taken on the line 8—8 of Fig. 6;

Fig. 9 is a detail view of a resistance element which may be employed in making a rheostat;

Fig. 10 is a vertical sectional view looking from the front of the machine and showing the molded object ready to be withdrawn from the machine;

Fig. 11 is a perspective view of the rheostat body and embedded resistance element before final assembly;

Fig. 12 is a plan view of the completed rheostat;

Fig. 13 is a longitudinal section through the rheostat taken on the line 13—13 in Fig. 12;

Fig. 14 is a cross sectional view taken on the line 14—14 in Fig. 13; and

Fig. 15 is an exploded detail view showing the parts of the control knob assembly which are combined with the molded object shown in Fig. 11 to produce the completed rheostat.

In Figs. 1 and 2 there is illustrated a conventional molding machine having a stand 20 supporting a table 22 on which is mounted a frame 24. A plunger 26 slidably mounted in the frame 24 carries an upper molding die 28. A lower molding die 30, Figs. 1, 2 and 3, is mounted on the table 22. Preferably a pneumatic molding machine is employed, the air cylinder 32 of this machine being mounted on the frame 24. Air under pressure is admitted to and released from the cylinder 32 under the control of a foot pedal 34. Movement of the piston in the cylinder 32 is transmitted to the plunger 26 by a lever 36. A plate 38 attached to the plunger 26 carries guide rods 40 which are received in suitable sockets in the lower die 30 for guiding the upper die in its reciprocatory movement.

The lower die 30 is of the cup type having a molding cavity 42, Fig. 3, therein which is shaped to correspond with the desired configuration of the rheostat body. A separate piece such as a block 44, Fig. 5, is disposed in the opening 42 to close off the bottom of the molding space, the purpose of this construction being explained hereinafter. A fixed pin 46 extends up through the lower die 30 and block 44 in alignment with a corresponding bore in the upper die 28 to provide the central hole 48, Figs. 11 and 14, in the body of the rheostat.

In accordance with a preferred embodiment of the invention, the body of the rheostat is molded from a liquid-settable material such as a hydraulic cement mixture, which on setting has good mechanical strength as well as properties of electrical insulation. It is to be understood that various plastic materials may be used, possessed of the foregoing characteristics, the plastic being set by heat, liquid, time, or otherwise in accordance with its particular properties and kind. In forming the body, a plastic mass of the material is packed into the opening 42 in the lower die 30, and the upper die 28 is then brought down into cooperation with the lower die. Preferably, to insure that the right amount of the material is used and to expedite the molding operation, the operator is provided with a crudely formed mass, such as 50, Fig. 4, of the material in its plastic state. This plastic mass or putty is inserted in the molding cavity 42, Figs. 3 and 5, around the fixed pin 46.

The resistance element 60 which is to be incorporated in the rheostat is generally of the type shown in Fig. 9 which comprises numerous turns of resistance wire 52 wound on a flexible insulating strip 54 such as mica. One or more soldering lugs 56 are connected to the respective ends of the wire 52 and riveted to the strip 54. (In the case of a series type rheostat, only one lug or terminal 56 may be required). The present invention enables the use of a resistance element having pre-tinned lugs 56, there being no firing operation which would burn off the tin coating. Prior to bringing the upper and lower molding dies 28 and 30 into cooperation the resistance element 60 is bent into a circular arc and fitted in an annular recess or groove 62, Figs. 5 and 8, in the upper die 28. Recess 62 is so shaped that it holds the resistance element 60 by gripping it only along the arcuate edge thereof nearest the lugs 56, these lugs then extending into suitable pockets in the upper die 28. The resistor 60 is frictionally held by the upper die 28 while the dies are apart. The sectional views, Figs. 5 and 6, are each taken on a section line such as 6—6 in Fig. 8 to show the manner in which the lugs 56 are fitted in the upper die 28.

To embed the resistance element 60 in the body of the rheostat, the die 28 is brought into cooperation with the die 30 as shown in Fig. 6. This operation forms the body 64, Fig. 11, of the rheostat from the mass 50, Fig. 4, and applies suitable pressure on the cementitious material. A vertical pin 66, Figs. 3 and 5, fixed in the movable block 44 forms a hole 68, Figs. 11, 13 and 14, in the body 64 to receive a contact screw or the like. Because of the manner in which the resistance element 60 is held by the upper die 28, and the uniform distribution of pressure throughout the plastic mass, the element 60 retains the desired circular shape and is not distorted by being embedded in the body 64. The cementitious material is squeezed into the interstices between adjacent turns of the wire on the resistance element 60, thereby firmly securing the element 60 in the body 64 and keeping the turns insulated from each other. The cement is prevented from rising into the groove 62 in the upper die 28 because of the close fit of the resistance element 60 in this groove. However, the excess water may rise into the groove 62 and be expelled through openings 70, Figs. 6 and 8, communicating with the groove 62 in the upper die 28.

The dies 28 and 30 are compressed into cooperative relation with sufficient force to eject excess water from the plastic mass and to compress the body 64 of the rheostat so that it will hold the resistance element 60 and retain its molded shape. The dies then are separated, leaving the body 64 and embedded resistor 60 in the lower die 30 as shown in Fig. 7. The block 44 is mounted on guide pins 72, Fig. 10, which extend through the die block 30 and table 22 and are secured at their lower ends to a bar 74 carried by a lever 76, Figs. 1 and 2. Coil springs 78 are disposed on the pins 72 between the under side of the table 22 and the bar 74 to urge the block 44 into its lower position, shown in Fig. 7. At the completion of the molding operation the ejector lever 76 is raised to elevate the block 44 as shown in Fig. 10, thus bringing the molded body 64 out of the lower die 30 into a position where it can be grasped by the operator and removed from the machine. At this stage the molded body 64 and embedded resistance element 60 appear as shown in Fig. 11.

After the molded body 64 of the rheostat has stood for a sufficient time to become thoroughly hardened, the remainder of the rheostat assembly is attached thereto. Any suitable knob assembly such as that shown in detail in Fig. 15 may be used. A center shaft 80 has a keyed connection to the knob 82 as shown in Fig. 13. A wiper arm 84, which also is keyed to the knob 82, engages the exposed portion of the resistor 60. An extension of the wiper arm 84 is urged by a coil spring 86 into engagement with a center lead 88 having a lug which extends radially outward from the center of the rheostat and is bent down into a recess 90, Figs. 11 and 14, afforded in the rheostat body 64. Recesses 92, Figs. 11 and 12, are provided in the body 64 in radial alignment with the lugs 56 of the element 60 so that these lugs can be bent down flush with the outer surface of the body 64. A contact screw (not shown) may extend through the hole 68 in the body 64 for electrical connection to the lead 88. A stop lug 92, Fig. 15, on the shaft 80 cooperates with a rib or shoulder 94 in the molded body 64, Fig. 14, to prevent the wiper contact 84 from riding past the ends of the resistance element 60. A threaded bushing 96 is retained on the staff 80 by a split ring 98. A nut 100 and washer 102 are mounted on the bushing 96, the nut 100 being tightened against the action of the coil spring 86 as can be seen in Fig. 13. Bent-up portions 104 of the washer 102 fit into suitable recesses in the body 64 to prevent turning of this washer.

The molded rheostat and method of making the same described herein afford many advantageous features. The article is relatively inexpensive to manufacture, and in most types of service it compares favorably with the more costly rheostat having the preformed baked ceramic body. The soldering lugs of the resistance element can be tinned before assembling the rheostat while they are readily accessible for this purpose. There being no firing process, the resistance wires and lugs are not oxidized, hence do not require any appreciable cleaning after the element is mounted and secured in the rheostat body. The rheostat body can be finished by buffing. Short-circuiting and breakage of the wire turns of the resistance element are greatly reduced. It should be understood that the invention, while it relates specifically to the manufacture of rheostats, can be applied in principle to other types of resistors and electrical circuit devices in general, to obtain various of the advantages listed above.

Obviously various changes may be made in the specific embodiment set forth for purposes of illustration without departing from the spirit of the invention. The invention is accordingly not to be limited to the specific embodiment shown and described, but only as indicated in the following claims:

The invention is hereby claimed as follows:

1. A rheostat or like article comprising a body composed of substantially homogeneous moldable material, an arcuately disposed resistance element partially embedded in said body, and a rotary contact mounted on said body and cooperating with the exposed portion of said resistance element.

2. A molded electrical resistor unit comprising a body of water-hardenable material, a resistance element partially embedded in said body, and an adjustable contact cooperating with the exposed portion of said resistance element.

3. A rheostat comprising a body composed of a substantially homogeneous moldable material, an arcuately disposed wire-wound resistor having its wire coils partially embedded in said body, and a rotary contact mounted on said body and cooperating with said resistor.

4. In a rheostat or like article having a wire-wound resistor, an insulating body composed of a cold moldable material, said resistor having its wire coils partially embedded in said body, and said moldable material penetrating the interstices between adjacent turns of said wire-wound resistor.

5. In a rheostat or like article having an arcuately arranged wire-wound resistor and a rotary contact cooperating therewith, said resistor comprising a wire coil spirally wrapped upon an insulating body, a molded insulating body composed of a hydraulic cement compound and intimately joined to a portion only of said resistor for supporting the same, said contact being rotatably mounted on said body and cooperating with the exposed portion of said resistor.

6. In the manufacture of an article such as a rheostat, said article having a wire resistance element wound on a flexible insulating strip, the method which comprises bending said element around a circular arc, partially covering said element along one arcuate edge thereof, molding a plastic mass of hardenable insulating material around the uncovered portion of said element to form a body for said article, exposing said one edge of said element, and hardening said body to afford a rigid mounting for said element.

7. In the manufacture of a molded article which includes an electrical resistance element, the method which comprises injecting said element into a plastic mass of settable insulating material, molding said mass into a body of predetermined shape around said element, and allowing said body to harden.

8. In the manufacture of a molded article which includes a resistance element having a portion adapted to cooperate with a movable contact, the method which comprises masking said portion of said element, embedding the remainder of said element in a body of hydraulic cementitious material, applying pressure to said body, exposing said portion of said element, and hardening said body to afford a rigid mounting for said element.

9. In the manufacture of a molded article which includes a wire-wound resistance element, the method which comprises partially embedding said element in a plastic body of hydraulic cementitious material, subjecting said body to pressure thereby to force the plastic cement compound into the interstices between adjacent turns of said wire-wound element, and hardening said body to afford a rigid mounting for said element.

10. In the manufacture of an article such as a rheostat by the use of molding dies, said article including a resistance strip having an edge adapted to cooperate with an adjustable contact, the method which comprises fitting said resistance strip in a die so that said edge thereof is covered and the remainder of said strip protrudes from the die, placing a mass of plastic material in an associated die, bringing said dies into cooperative relation thereby to exert pressure upon said mass and form the same into a body of predetermined shape around said protruding portion of said strip, maintaining said dies in cooperative relation until a partial hardening of said body is produced, removing said body and said strip embedded therein from the dies, and completing the hardening of said body.

11. A method of making a rheostat by the use of molding dies, said rheostat including a wire resistance element wound on a flexible insulating strip, and a rotary contact cooperating with said element along one edge thereof, said method comprising the steps of bending said element to dispose said one edge thereof on a circular arc, fitting said element into a die so that said one edge thereof is held by the die and the remainder of said elment protrudes from the die, placing a plastic mass of hydraulic cementitious material in an associated die, bringing said dies into cooperative relation thereby to exert pressure upon said mass and form the same into an insulating body of predetermined shape around said protruding portion of said element, draining the excess liquid from said body, maintaining said dies in cooperative relation until a partial hardening of said body is produced, removing said body and said element embedded therein from the dies, and allowing said body to dry and complete its hardening.

HARRY CHANOWITZ.

REFERENCES CITED

The following references are of record in the file of this patent:

UNITED STATES PATENTS

| Number | Name | Date |
|---|---|---|
| 943,384 | Brown | Dec. 14, 1909 |
| 994,355 | Wirt | June 6, 1911 |
| 1,691,251 | Rathbone | Nov. 13, 1928 |
| 1,877,926 | Mattern | Sept. 20, 1932 |
| 2,302,564 | Megow et al. | Nov. 17, 1942 |